United States Patent Office 3,166,143
Patented Jan. 19, 1965

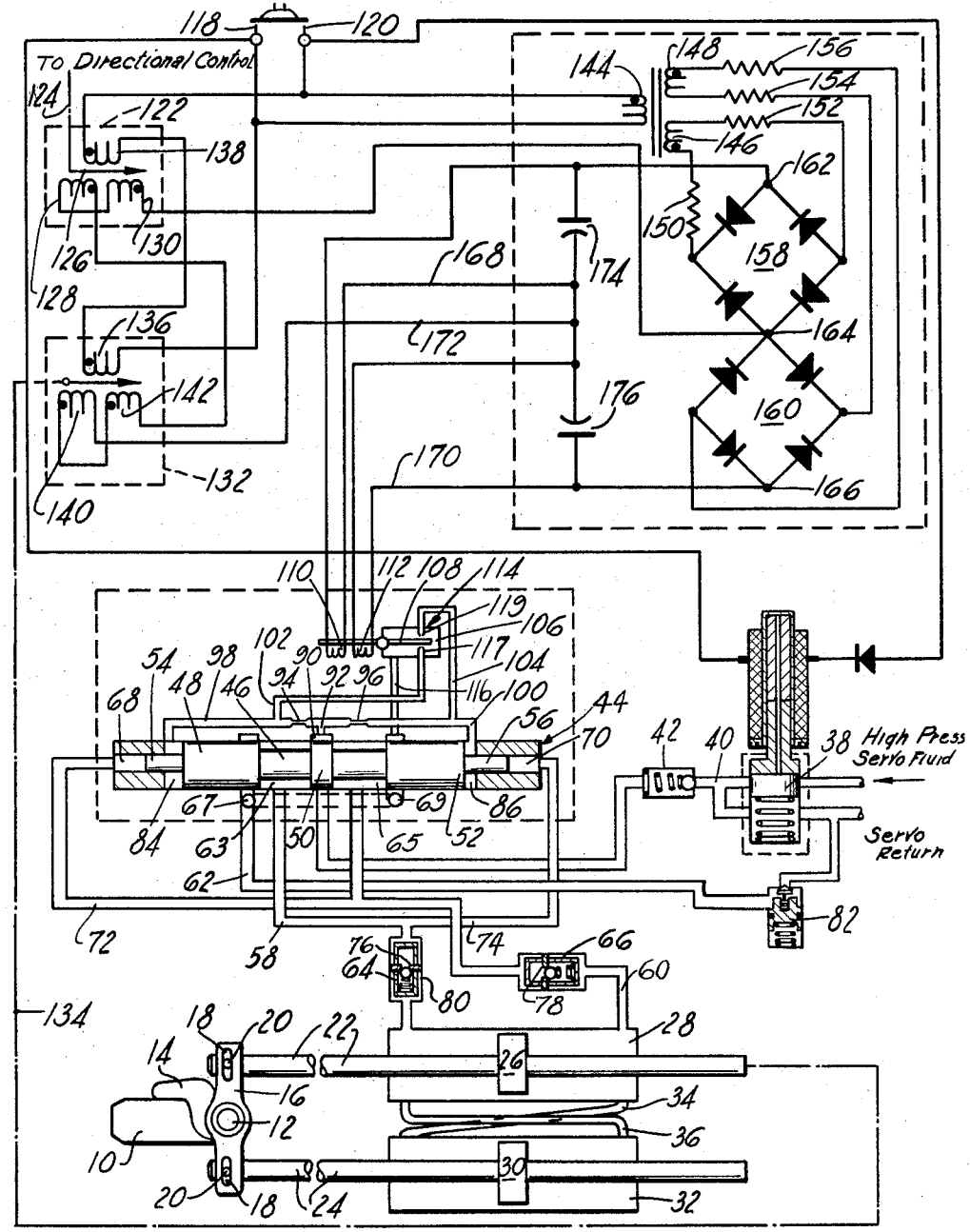

3,166,143
POWER STEERING MEANS
Edwin Gonter, Jr., and Robert A. Elliott, South Bend, Ind., assignors to The Bendix Corporation, South Bend, Ind., a corporation of Delaware
Filed Dec. 17, 1962, Ser. No. 245,131
8 Claims. (Cl. 180—79.1)

This invention pertains to a power steering system and more particularly to a power steering unit in which a hydro-mechanical power steering system is controlled by an alternating current electric steering control system including variable differential transformers and a phase sensitive demodulator circuit.

As stated in U.S. Patent No. 3,007,655 assigned to the common assignee, the need for steerable nose wheels on aircraft is ever increasing. Therefore, as in the patent mentioned, it is an object of the present invention to provide a control system for a hydro-mechanical power steering device having great sensitivity of control and being fail-safe in operation.

It is another object to provide a control system having variable sensitivity.

It is also an object to provide a power steering system having electrical control means arranged to be fail-safe in operation.

It is a further object to provide simple durable electrical steering control means which are extremely lightweight and which require very little space.

A still further object is to provide in the event of a double failure a steerable nose wheel which is controlled through its inherent castering action.

Other objects and advantages will appear to those skilled in the art from the accompanying description of the single figure which shows a casterable and steerable wheel in combination with suitable operated hydraulic motor means for controlling the steered position of said wheel and electrical actuating means for said hydraulically actuated power means.

Referring now to the drawing, a steerable wheel 10 is attached to a rotatable shaft 12 by means of an offset strut 14. Fastened to shaft 12 is a link 16 having slots 18 receiving a pair of pins 20 which are attached to a pair of axially movable shafts 22 and 24. Shafts 22 and 24 form part of the hydraulic motor system including a piston 26 drivably attached to shaft 22 and positioned within a cylinder 28 and a piston 30 drivably connected to shaft 24 and positioned within a cylinder 32. A conduit 34 provides communication between the right side of piston 26 and the left side of piston 30; whereas a conduit 36 provides communication between the left side of piston 26 and the right side of piston 30. It will therefore be understood that whenever high pressure servo fluid is supplied to one side of one piston, it is also supplied to the opposite side of the other piston, and that this will result in translation of said pistons in opposite directions and a consequent rotation of link 16, shaft 12 and wheel 10. Just as sure and controlled a steering action could be obtained from a single actuator which would reduce overall weight attributable to the steering system. If one were to visualize the removal of cylinder 32 and the conduits 34 and 36 as well as the appurtenances, one would readily see such a single actuator system.

High pressure servo fluid is supplied to the hydraulic motors from a source (not shown) through a solenoid actuated valve 38, a conduit 40, and a check valve 42 to a control valve outlined as at 44. The control valve contains a valve spool 46 having lands 48, 50 and 52 and pistons 54 and 56 at each end. A pair of conduits 58 and 60 provide communication between the control or servo valve 44, as it may be termed, and opposite ends of the cylinder 28. As shown, the spool valve is in a neutral position blocking flow to the cylinders. Movement of the spool valve 46 to the right communicates high pressure servo fluid line 40 with conduit 58 to apply fluid pressure on the left side of piston 26 and the right side of piston 30. At the same time communication is established between conduit 60 and a servo fluid return line 62 to relieve the right and left sides of cylinders 28 and 32, respectively. Thus, the wheel 10 will rotate clockwise to steer the associated vehicle (not shown) to the right. Although the wheel arrangement is shown with an aircraft application, it is to be understood that the type of actuation is universal and could be connected in automobile steering linkages. It is also to be understood that movement of spool 46 to the left would give opposite steering for any associated vehicle.

In order to provide unidirectional flow restriction and casterable qualities to wheel 10, check valves 64 and 66 and orifices 76 and 78 are provided in lines 58 and 60, respectively, and lines 60 and 58 are communicated to chambers 68 and 70 by conduits 72 and 74, respectively. In Patent No. 3,007,655 mentioned there was employed an additional control valve which is eliminated in our invention by making the spool valve responsive to cylinder pressure as above described. This in turn provides our steering system with shimmy damping in both power and non-power conditions of operation. In addition, a pair of small bleed orifices 76 and 78 are employed in check valves 64 and 66, respectively, to assist in inhibiting or damping shimmy forces which might be transmitted to the actuator pistons 26 and 30 from the wheel 10.

Suppose, for instance, a shimmy oscillation is acting on piston 26 which first causes piston 26 to move to the right. Fluid is forced out of cylinder 28 and kinetic energy is transformed to heat by orifice 78 to dissipate energy. As pressure builds up in conduit 60 it will act on piston 54 to cause the control valve spool 46 to open conduit 60 to the system return conduit 62. If, for some reason, return pressure in conduit 62 is higher than inlet pressure, a pressure responsive unidirectional flow valve 80 would open return to inlet. In case fluid supply is blocked, this would allow fluid to flow back to the cylinder 28 opposite the side from which it came to prevent cavitation in cylinder 28. In the event the solenoid actuated valve 38 is open, inlet fluid pressure will be supplied to prevent cavitation and it may be assisted by return flow when, as above, return pressure is higher than inlet pressure.

We also employ a compensator valve 82 in the return system, which in conjunction with check valve 42 and valve 80 operates to maintain a certain fluid pressure level in the control system even though, as mentioned above, the high pressure servo fluid may no longer be available from the source. The compensator valve 82 also serves to relieve undesirable high pressures which might occur in the system because of temperature changes in the servo fluid.

In addition to the above means for controlling valve spool 46, the valve 44 is controlled through electrical means effective to vary the fluid pressure operating against the ends of the spool by way of chambers 84 and 86 at each end of the valve spool. As seen, servo pressure is always communicated to a chamber 90 surrounding land 50 thence to a passage 92 which passage terminates in restricted orifices 94 and 96. From the flow restrictors 94 and 96, the fluid or servo pressure is directed through passages 98 and 100 to chambers 84 and 86, respectively. Bleed passages 102 and 104 are respectively attached to passages 98 and 100, which bleed passages end in opposed ports to a chamber 106 containing a flapper valve 108 controlled by windings 110 and 112. The valve 108 and windings 110 and 112 form a torque motor 114 for controlling the amount of fluid which will be exhausted from chamber 106 by way of passage 116 leading to the return line 62.

Inasmuch as the fluid pressure circuits for chambers 84 and 86 are essentially similar, a stream of high pressure fluid is directed against each side of flapper valve 108; and, as long as it, valve 108, maintains a neutral position, as shown, there will be no unbalanced force tending to move spool 46 from its neutral position shown. Should, however, flapper valve 108 be moved to a position closer to the outlet of either of conduits 102 or 104, an unbalanced force will be developed due to blocking of flow from the conduit so approached by valve 108 to raise the pressure in either chamber 84 or 86 to cause spool 46 to move to relieve such pressure unbalance. In addition, as valve 108 blocks one passage it opens the other further to decrease resistance to spool movement requested.

As may be readily seen by those skilled in the art, the movement of the spool 46 is such as to set up a flow restriction between conduits 58 and 60 and the return line 62 to resist shimmy effect on spool 46; i.e., as the spool 46 is moved by shimmy forces, fluid from one of the chambers 63 or 65 will be displaced through a restricted passage formed by lands 48 and 52 and the walls of return chambers 67 and 69, which restriction acts to dissipate energy, as aforementioned. The response of spool 46 is also controlled by nozzles 117 and 119, which nozzles control fluid flow to return 116 from chambers 84 and 86, respectively.

As for the electrical system controlling the signals to windings 110 and 112, we have utilized an alternating current (A.C.) system with alternating current forming a power source to conductors 118 and 120. Generally speaking, our alternating current system includes an input sensor, a phase sensitive demodulator circuit and an output sensor.

More particularly, we propose to connect an operator controlled steering member, rudder pedals, steering wheel, etc., to a variable differential transducer 122 hereinafter referred to as a command transducer having a dual secondary winding with a single primary winding. This connection is preferably by way of a mechanical link 124 between the aforementioned steering mechanism and the movable core 126. The core is arranged to induce voltage in a dual secondary element having windings 128 and 130 such that the output voltage from the primary to the secondaries is first in-phase then out-of-phase and with respective high points in each phase and a null condition therebetween.

The command transducer is in series connection with a feedback transducer 132 having a mechanical link 134 with the nose wheel actuator, as shown. The primary winding 136 is connected by an appropriate lead to the power source and to a primary winding 138 of the command transducer which is then connected to the power source by another lead to complete the series arrangement. The dual secondary windings 126 and 128 are in series with similar dual secondary windings 140 and 142 of the feedback transducer.

A power transformer primary winding 144 is in parallel with the primaries 136 and 138, which power transformer incorporates an in-phase secondary 148 and an out-of-phase secondary 146. Current limiting resistors 150, 152, 154 and 156 reduce the voltage from the secondaries 146 and 148. Each of the two secondaries 146 and 148 are independently connected to a demodulator or gate groups of detector rectifying diodes 158 and 160 having power take-offs 162, 164 and 166. Thus, we have provided a full wave action circuit with each gate group 158 and 160 having half wave action. From power take-off 162 we provide a lead to winding 110 and from power take-off 166 we provide a lead to winding 112, both of the torque motor 114. The circuit to the windings 110 and 112 of torque motor 114 is completed by leads 168 and 170, respectively, commonly connected to another conductor 172 leading to the dual secondary of transducer 132, to transducer 122 and thence to power take-off 164 to alternatively connect one of the torque motor windings to one or the other demodulator circuits.

In order to smooth or flatten the peaks of half wave action, we provide capacitors 174 and 176 in the common lead across the leads from power take-offs 162 and 166.

In operation the operator moves his steering control 124 to move the core 126 to a position such that the signal voltage supplied by the transducer 122 is either in-phase with the source or line voltage when the core is on one side of the null position or 180° out-of-phase when the core is on the other side of the null position. At the same time the core of transducer 132 is acting in accordance with the azimuth position of wheel 10 and the voltage from transducer 132 is "bucked" against that of transducer 122 such that the signal from transducer 122 is compared in both phase and magnitude with the A.C. signal of transducer 132. The resultant control signal is supplied to the phase sensitive demodulator or gate circuits 158 and 160. Here the signals are rectified to provide "Bi-Polar" direct current to the four-wire torque motor 114. The resultant motion of the torque motor arm or flapper valve 108, as termed previously, corresponds to the phase and magnitude of the control signal, and, as mentioned, controls the position of spool 46 controlling pistons 26 and 30 which control the steering of wheel 10.

The demodulator circuit provides for full wave rectification of the sensors A.C. signal with each circuit 158 or 160 or bridge network, as they may be termed, contributing one half wave. This circuitry allows failure of one diode in any bridge network without failure of control over wheel 10. The gain would be lowered, but only in one direction of turn.

To eliminate any possibility of a hard-over signal upon failure of one transducer, the transducers, both primaries and secondaries, are in series which means any such failure results in a loss of power and no control signal can be sent.

Although only one embodiment is shown and described herein, it is recognized that modifications may be made without departing from the spirit of the present invention.

We claim:
1. In a power steering system including a steerable wheel, a motor means including a cylinder and a piston in said cylinder effective to divide said cylinder into two chambers, which piston is operably connected to steer the wheel, servo valve means controlling the motor means, an actuator for said servo valve means comprising:
   a torque motor; and
   electrical means for controlling said torque motor, which electrical means includes a differential command transducer, a differential feedback transducer in series with said command transducer and operatively connected to said wheel, a power transformer having means to divide a signal supplied thereto into separate phases, a demodulator circuit having parallel connected groups of detector rectifying diodes each of which receives a separate phase of said signal from said power transformer to provide intermittent direct current signals which singularly and combined control said torque motor.
2. A power steering system comprising:
   a steerable wheel;
   a motor means operatively connected to said wheel;
   a control means for operating said motor means;
   an actuating system for said control means including series connected command and feedback differential transducers for controlling an alternating current, said feedback transducers being linked with said wheel, a power transformer having phase dividing secondaries and a demodulating circuit of groups of detector rectifying diodes each group of which is separately connected to one of said phase dividing secondaries such that said groups are phase sensitive in operation to provide half wave action, said groups of detector rectifying diodes being connected in parallel and to said control means with alternating in-phase and out-of-phase signals each of which is capable in and of itself to actuate said control means; and means to supply a steering request to said command transducer to vary the conductivity of said demodulator circuit to actuate said control means.

3. In an electro-hydraulic steering system including an alternating current supplied power transformer with dual secondaries receiving said current from series connected command and feedback differential transducers according to phase and directing the in-phase and out-of-phase portions to separate parallel connected sensitive gate groups of detector rectifying diodes with a means to vary the conductivity of said gate groups to vary a signal controlling a torque motor, a hydraulic steering means comprising:

a steerable wheel;
a motor means including a cylinder divided into two chambers by a piston and a piston rod connecting said motor means to said steerable wheel;
a servo valve controlling said motor means, said servo valve having an inlet port, a return port, and control ports separated by a spool valve having pressure responsive pistons on each end of said spool valve;
separate conduit means connecting said chambers of said motor means to said control ports while maintaining separation of said chambers;
check valve means in each of said conduits arranged to permit flow from said servo valve to said chambers and provided with bleed passages to restrict flow from either of said chambers to either of said control ports;
means to connect each of said conduits to opposite ends of said servo valve to provide said pressure responsive pistons with a fluid tending to operate said servo valve spool to open the pressurized conduit to the return port; and
passage means connected to the inlet port to utilize inlet pressure to operate said spool valve, which passage means is controlled by said torque motor.

4. A power steering system according to claim 2 and further comprising capacitor means to flatten the peak of half wave action, which capacitor means is located between said command and feedback transducers and said demodulator circuits.

5. A control system comprising:
a steerable wheel;
a means to position said steerable wheel including a pressure responsive servo valve controlling a passage means for a pressure responsive device, which pressure responsive device is connected to said steerable wheel, said servo valve being responsive to wheel position to control fluid flow from said pressure responsive device as well as to said pressure responsive device through said passage means;
a fluid supply system connected to said means positioning said steerable wheel, said fluid supply system including an inlet conduit and a return conduit connected through said servo valve with means to maintain a preselected fluid pressure within said fluid supply system;
a valve means controlling a bypassed flow from said inlet to said return conduits to position said servo valve to open either said inlet or said return conduits to said passage means, said valve means being actuated through a pair of electrical windings; and
an electrical control network for actuating said valve, which electrical control system includes a command transducer having a primary winding and multiple secondary windings with a conductance varying phase shifting core operatably interposed, a feedback transducer having a primary winding and multiple secondary windings with a conductance varying phase shifting core operatably interposed, a means connecting said command transducer primary winding and said feedback transducer winding in series to a power source, a power transformer having a primary winding in parallel with said primary windings of said command and feedback transducers and a pair of secondary windings adapted to separate a signal supplied to said power transformer primary into its various phases, a pair of phase sensitive demodulator groups one of which is separately connected to one of said power transformer secondaries while the other demodulator group is connected to the other power transformer secondary and means to connect said demodulator groups in parallel through said secondaries of said command and feedback transducers, which secondaries are in series with said electrical windings of said valve means whereby a signal from either or both of said demodulator circuits energizes one or both of said electrical windings in said valve to operate said valve to control said means positioning said steerable wheel.

6. A control system according to claim 5 and further comprising a pair of capacitors individually in parallel with each of said electrical windings of said valve means.

7. A control system comprising:
a steerable wheel;
a means to position said steerable wheel including a pressure responsive servo valve;
a fluid supply system connected to said means positioning said steerable wheel, said fluid supply system including an inlet conduit, a return conduit interposed with said servo valve, and a means to maintain a preselected fluid pressure within said fluid supply system;
a valve means controlling a flow bypassed from said inlet to position said servo valve, which valve means is actuated by at least one of a pair of electrically conductive windings; and
an electrical control network for actuating said valve, which electrical control network includes a command transducer having a primary winding and multiple secondary windings with a conductance varying phase shifting core operatably interposed, a feedback transducer having a primary winding and multiple secondary windings with a conductance varying, phase shifting core operatably interposed, a means connecting said command transducer primary winding and said feedback transducer winding in series to a power source, a power transformer having a primary winding connected to said power source and a pair of secondary windings adapted to separate an in-phase and an out-of-phase signal supplied to said power transformer primary winding, a pair of phase sensitive demodulator groups, one of which is separately connected to one of said power transformer secondaries strengthening the in-phase signal with the other demodulator group being connected to the out-of-phase secondary winding and means to complete the electrical control network connecting the demodulator groups in parallel through said command and feedback secondaries, which command and feedback secondaries are in series, to a common connector and through a pair of capacitors with leads from each of said demodulator groups being connected severally to respective windings of said valve.

8. A control system comprising:
a steerable wheel;
a means to position said steerable wheel including a valve means having an electrical actuator; and
an electrical control network for actuating said valve, which network includes a command transducer having a primary winding and multiple secondary windings with a conductance varying, phase shifting core operatably interposed, a feedback transducer having a primary winding and multiple secondary windings with a conductance varying, phase shifting core operatably interposed, a means connecting said command and feedback transducers in series with a power source, a means connecting said secondaries in series with each other, a power transformer having a primary winding connected to said power source and a pair or secondary windings adapted to separate an in-phase and an out-of-phase signal supplied to said power transformer primary winding, a pair of phase sensitive demodulator groups one of which is separately connected to one of said power transformer secondaries strengthening the in-phase signal with the other demodulator group being connected to the out-of-phase secondary winding and means to complete the electrical control network connecting the demodulator groups in parallel through the means connecting said transducer secondaries to a common connector and through a pair of capacitors to said groups with leads from each of said demodulator groups being severally connected to said electrical actuator of said valve means.

References Cited in the file of this patent
UNITED STATES PATENTS

| | | |
|---|---|---|
| 2,814,452 | Blanchard | Nov. 26, 1957 |
| 2,901,683 | Bennett et al. | Aug. 25, 1959 |
| 2,905,878 | Olson | Sept. 22, 1959 |
| 2,953,324 | Barr et al. | Sept. 20, 1960 |
| 3,007,655 | Criswell et al. | Nov. 7, 1961 |